United States Patent
Schwarz et al.

(10) Patent No.: US 11,507,185 B1
(45) Date of Patent: Nov. 22, 2022

(54) ELECTROOCULOGRAPHY-BASED EYE TRACKING USING NORMALIZED ELECTRODE INPUT

(71) Applicant: Lenovo (United States) Inc., Morrisville, NC (US)

(72) Inventors: David Schwarz, Morrisville, NC (US); Russell Speight VanBlon, Raleigh, NC (US); John W Nicholson, Cary, NC (US); Scott Li, Cary, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 0 days.

(21) Appl. No.: 17/474,014

(22) Filed: Sep. 13, 2021

(51) Int. Cl.
  *G06F 3/01* (2006.01)
  *G01C 19/56* (2012.01)
  *G06F 3/0482* (2013.01)

(52) U.S. Cl.
  CPC ............. *G06F 3/013* (2013.01); *G01C 19/56* (2013.01); *G06F 3/0482* (2013.01)

(58) Field of Classification Search
  CPC ........ G06F 3/013; G06F 3/0482; G06F 3/015; G01C 19/56
  See application file for complete search history.

(56) References Cited

U.S. PATENT DOCUMENTS

| | | | | |
|---|---|---|---|---|
| 2011/0213664 | A1* | 9/2011 | Osterhout | G06F 3/013 705/14.58 |
| 2016/0116995 | A1* | 4/2016 | Wilson | A63F 13/42 345/157 |
| 2019/0174237 | A1* | 6/2019 | Lunner | G06F 1/163 |
| 2019/0320891 | A1* | 10/2019 | Meroni | G06F 3/011 |

OTHER PUBLICATIONS

"Electrooculography", Wikipedia, retrieved on Aug. 13, 2021 from https://en.wikipedia.org/wiki/Electrooculography.
"Eye tracking", Wikipedia, retrieved from https://en.wikipedia.org/wiki/Eye_tracking.
"Frequency drift", Wikipedia, retrieved from https://en.wikipedia.org/wiki/Frequency_drift.
Hládek et al., "Real-time estimation of horizontal gaze angle by saccade integration using in-ear electrooculography", Jan. 5, 2018, retrieved from https://journals.plos.org/plosone/article?id=10.1371/journal.pone.0190420.

* cited by examiner

*Primary Examiner* — Stephen G Sherman
(74) *Attorney, Agent, or Firm* — John M. Rogitz; John L. Rogitz

(57) ABSTRACT

In one aspect, a headset may include at least one processor, at least two electrodes accessible to the at least one processor, an inertial measurement unit (IMU) accessible to the at least one processor, and storage accessible to the at least one processor. The storage may include instructions executable by the at least one processor to receive input from the at least two electrodes, receive input from the IMU, and normalize the input from the at least two electrodes based on the input from the IMU. The instructions may then be executable to perform eye tracking using electrooculography (EOG) based on the normalized input from the at least two electrodes.

20 Claims, 5 Drawing Sheets

ELECTROOCULOGRAPHY-BASED EYE TRACKING USING NORMALIZED ELECTRODE INPUT

FIELD

The disclosure below relates to technically inventive, non-routine solutions that are necessarily rooted in computer technology and that produce concrete technical improvements. In particular, the disclosure below relates to techniques for electrooculography-based eye tracking using normalized electrode input.

BACKGROUND

As recognized herein, infrared (IR) eye tracking using IR cameras can require precise IR camera positioning that is often untenable in the form factors of lightweight head-mounted displays (HMDs) owing to their relatively lighter weight. Additionally, as also recognized herein, the processor burden and corresponding power consumption used for IR-based eye tracking can also be excessive, preventing effective execution of other complex tasks that the processor might attempt to execute in parallel and draining the device's battery too fast. For example, in at least some instances, host CPU utilization for IR-based eye tracking might be around fifty percent of one processor core per eye. There are currently no adequate solutions to the foregoing computer-related, technological problem.

SUMMARY

Accordingly, in one aspect a headset includes at least one processor, at least two electrodes accessible to the at least one processor, an inertial measurement unit (IMU) accessible to the at least one processor, and storage accessible to the at least one processor. The storage includes instructions executable by the at least one processor to receive input from the at least two electrodes, receive input from the IMU, and normalize the input from the at least two electrodes based on the input from the IMU. The instructions are then executable to perform eye tracking using electrooculography (EOG) that is executed based on the normalized input from the at least two electrodes.

In some examples, the at least two electrodes may include first and second electrodes juxtaposed on a left portion of the headset, and third and fourth electrodes juxtaposed on a right portion of the headset. The first and second electrodes may contact a wearer's skin around the wearer's left eye while wearing the headset, and the third and fourth electrodes may contact the wearer's skin around the wearer's right eye while wearing the headset.

In example implementations, the IMU may include one or more accelerometers, gyroscopes, and/or magnetometers that provide the input from the IMU.

Also in various example implementations, the headset may include a display accessible to the at least one processor, and the instructions may be executable to perform the eye tracking to present augmented reality (AR) content on the display according to the eye tracking and/or to identify user selection of a graphical object presented on the display.

Still further, in some example embodiments the instructions may be executable to execute a calibration process at least in part at the headset and normalize the input from the at least two electrodes based on the input from the IMU and data from the calibration process. So, for example, the instructions may be executable to execute the calibration process at least in part by moving one or more graphical objects about the headset's display and tracking a user's eyes using EOG as the user views the one or more graphical objects moving about the display.

Still further, in various examples the headset may be established by smart glasses. The headset may also include at least one transparent lens with an integrated display, as well as a battery that powers the at least one processor and the integrated display.

In another aspect, a method includes receiving input from at least two electrodes on a headset, receiving input from an inertial measurement unit (IMU) on the headset, and processing the input from the at least two electrodes and the input from the IMU to perform eye tracking.

In some example implementations, the method may include normalizing the input from the at least two electrodes based on the input from the IMU and performing the eye tracking using electrooculography (EOG) that is executed based on the normalized input from the at least two electrodes. For example, the method may include executing a calibration process at least in part at the headset and then normalizing the input from the at least two electrodes based on the input from the IMU and the calibration process. The calibration process itself may be executed at least in part by moving one or more graphical objects about a display of the headset and tracking a user's eyes via EOG as the user views the one or more graphical objects moving about the display.

Additionally, in some examples the method may include receiving input from at least first, second, third, and fourth electrodes on the headset, and receiving input from the IMU on the headset. In these examples, the method may then include processing the input from the first and second electrodes and the input from the IMU to perform eye tracking for a user's left eye, and also processing the input from the third and fourth electrodes and the input from the IMU to perform eye tracking for the user's right eye.

In some examples, the input from the IMU may include input from an accelerometer in the IMU.

Also in some examples, the method may include performing the eye tracking to present augmented reality (AR) content on a display according to the eye tracking.

In still another aspect, at least one computer readable storage medium (CRSM) that is not a transitory signal includes instructions executable by at least one processor to receive input from at least four electrodes on a headset, receive input from an inertial measurement unit (IMU) on the headset, and process the input from the at least four electrodes and the input from the IMU to perform eye tracking.

Thus, in one example the instructions may be executable to normalize the input from the at least four electrodes based on the input from the IMU and then perform the eye tracking that is executed based on the normalized input from the at least four electrodes.

The details of present principles, both as to their structure and operation, can best be understood in reference to the accompanying drawings, in which like reference numerals refer to like parts, and in which:

DETAILED DESCRIPTION

Figure 1:
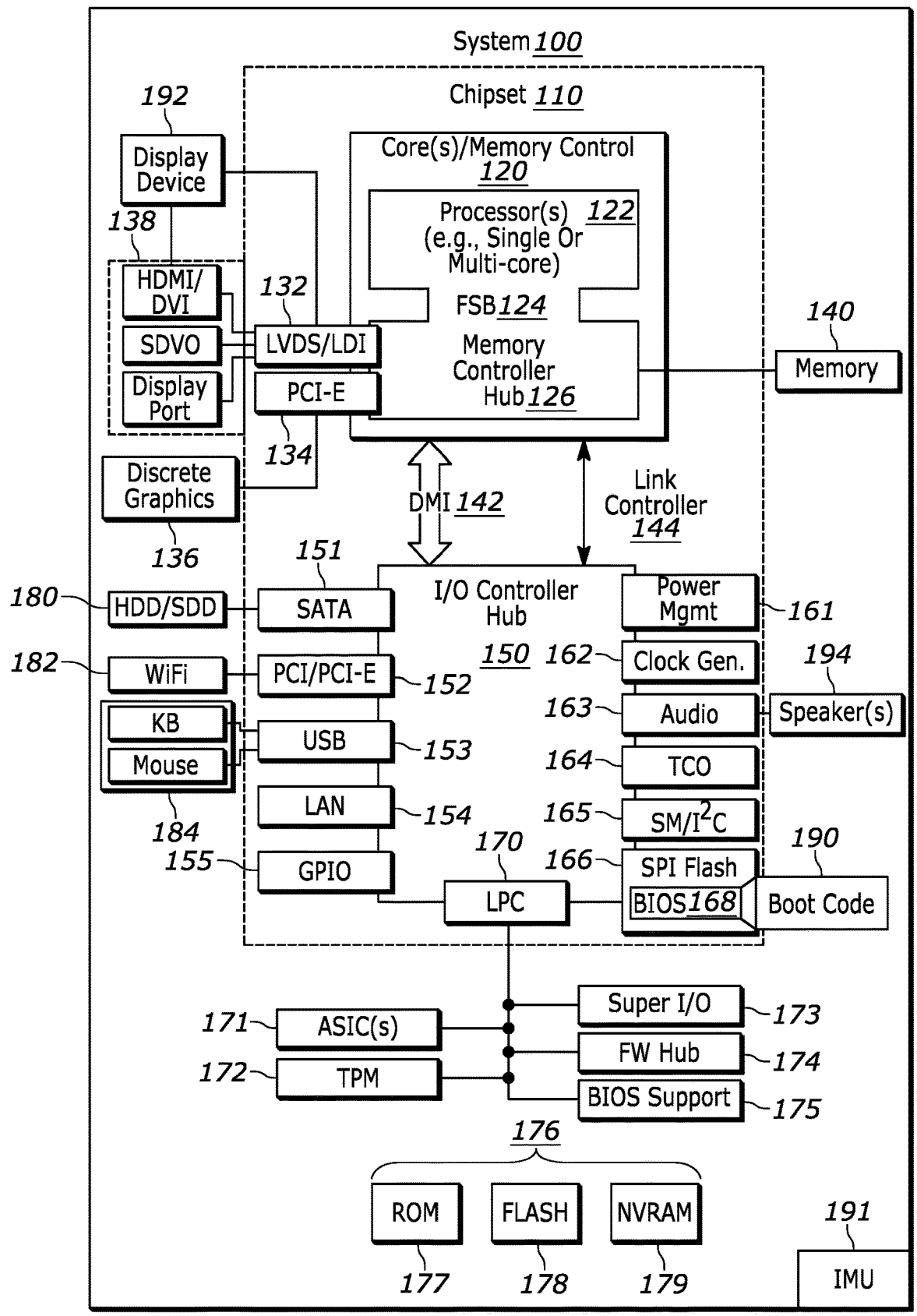
FIG. 1 is a block diagram of an example system consistent with present principles.

In addition to IR-based eye tracking consuming an undue amount of device resources, affecting device performance for other tasks, the present application further recognizes that electrooculography (EOG) can be used for eye tracking. This might include using electrodes placed around the user's eyes to measure the potential differences of the retina in different rotations away from electrode leads. But as recognized herein, this technique by itself is not sufficiently accurate since it may be subject to drift, particularly for smooth pursuit eye tracking, and slower movements in smooth pursuit in particular. Thus, the disclosure below discusses techniques to enhance the accuracy of EOG eye tracking to more-accurately track blinks and eye gaze/ rotations (e.g., even when the user's eye lids are closed) with additional processing techniques using input from other HMD sensors.

Accordingly, among other things, the detailed description below discusses making use of the "sunglass" HMD form factor to place electrode contacts around the user's eyes. Though the present disclosure is not limited to sunglass-type HMDs, sunglass-type HMDs in particular may be used to accomplish this sensing as they may be worn for augmented reality (AR) applications for which eye tracking might be used, and the relatively tight fit around the eyes provided by these types of devices is particularly helpful for measuring EOG.

Additionally, the disclosure below discusses use of additional HMD sensors for correcting drift in the EOG signal (s). This might include using the HMD's inertial measurement unit (IMU) to correct or normalize the EGO signal for tracking smooth pursuit movements while the head turns and smooth pursuit while the head is in place (as well as other movements). Additionally, or alternatively, an HMD camera that might be an RGB camera as opposed to an IR camera might be used to measure smooth pursuit in one eye and fuse that with the EOG.

Even more electrodes/leads on the HMD beyond two per eye may also be used to measure extraocular EMGs, particularly superior, lateral, and inferior rectus as well as skin conductance drift correction (e.g., based on the user sweating or shuffling across carpet). Their frequency domain response can be mapped to both saccades and smooth pursuit, for example.

Accordingly, in using the techniques set forth herein, eye tracking may be performed via a computationally much less burdensome estimation of gaze and eye position. This in turn may allow data collection of time of fixation, efficient use in salient product features, or other kinds of market data, while also allowing for rich contextual information sourcing for artificial intelligence (AI) agents.

As also discussed below, an HMD operating consistent with present principles may execute a calibration process inside the HMD itself (e.g., without any additional assistance) by presenting virtual objects to the user and configuring the IMU/EOG fusion through a calibration exercise.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general-purpose single- or multi-chip processor that can execute logic by means of various lines such as address lines, data lines, and control lines and registers and shift registers. Moreover, any logical blocks, modules, and circuits described herein can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM, or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing, or reading and writing information on one or more drives 180 such as HDDs, SDDs or a combination thereof, but in any case, the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still further, the system may include an inertial measurement unit (IMU) 191 that itself may include one or more accelerometers, gyroscopes, and/or magnetometers that may sense movement and/or orientation of the system 100 and provide related input to the processor(s) 122. More specifically, the IMU's gyroscope may sense and/or measure the orientation of the system 100 and provide related input to the processor 122, the IMU's accelerometer may sense acceleration and/or movement of the system 100 and provide related input to the processor 122, and the IMU's magnetometer may sense the strength of a magnetic field and/or dipole moment to then provide related input to the processor 122 (e.g., to determine the system 100's heading and/or direction relative to the Earth's magnetic field).

Still further, the system 100 may include an audio receiver/microphone that provides input from the microphone to the processor 122 based on audio that is detected, such as via a user providing audible input to the microphone. The system 100 may also include a camera that gathers one or more images and provides the images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather still images and/or video.

Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
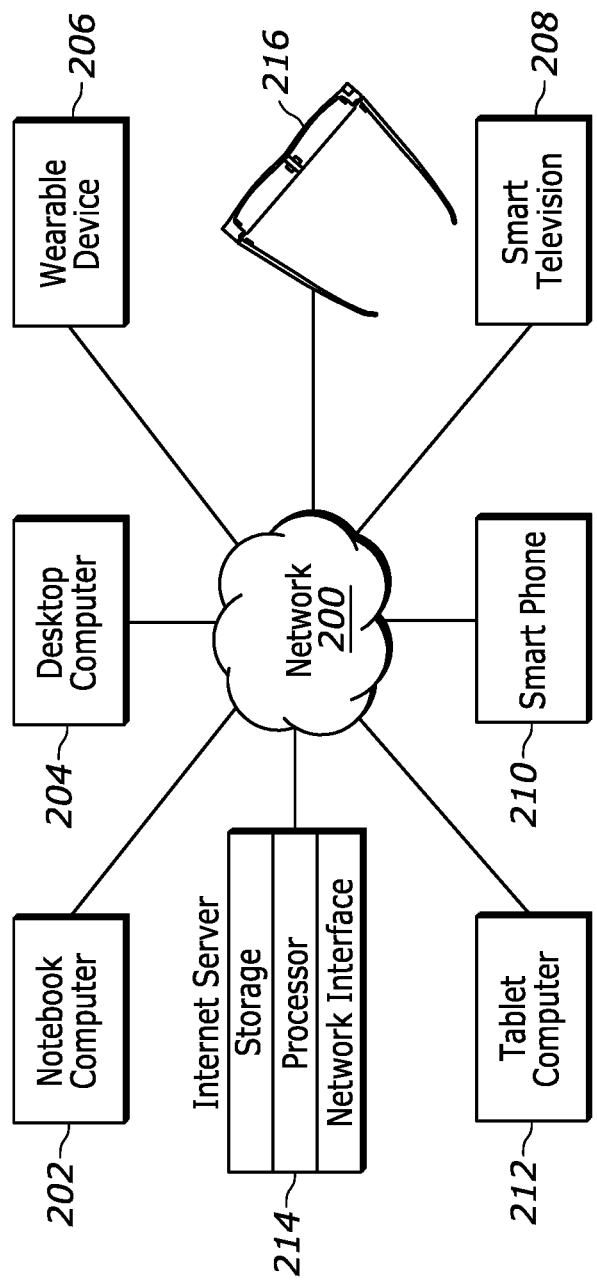
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a headset/head-mounted display (HMD) 216, and a server 214 such as an Internet server that may provide cloud storage accessible to the devices 202-212, 216. It is to be understood that the devices 202-216 may be configured to communicate with each other over the network 200.

Figure 3:
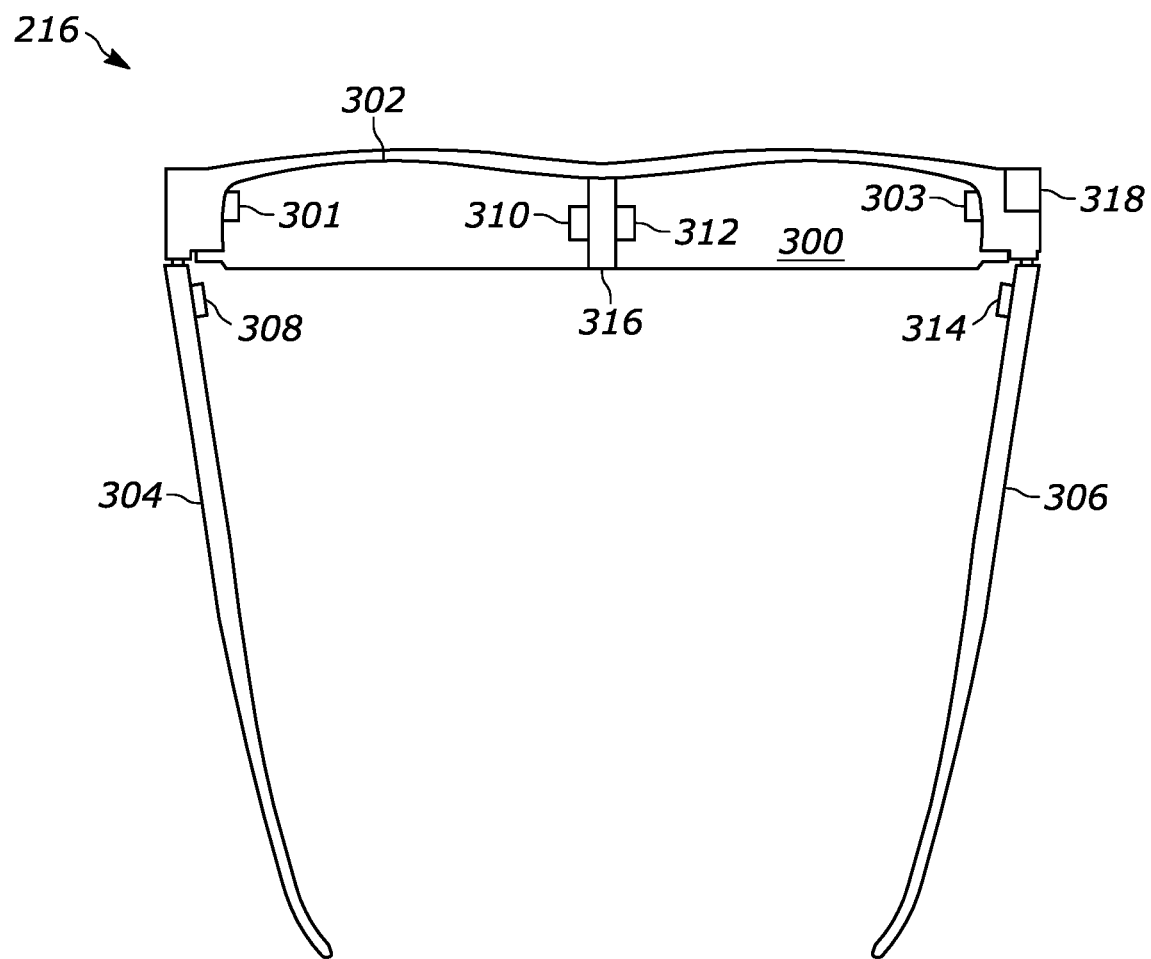
FIG. 3 is a top plan view of an example headset consistent with present principles.

Describing the headset 216 in more detail, reference is now made to the top plan view of FIG. 3. As may be appreciated from this figure, the headset 216 may include one or more lenses 300 coupled to a bridge 302 of the headset, such as discrete left and right lenses as shown. The lenses 300 may include one or more transparent "heads up" electronic displays integrated into the lenses 300 to present content (possibly stereoscopically for AR applications) consistent with present principles. The headset 216 may also include a left arm/temple 304 and a right arm/temple 306. In some examples, the left and right temples 304, 306 may each be elongated, unitary arms coupled to the bridge 302 via respective hinges. The temples 304, 306 may thus extend from the bridge 302 over respective left and right ears and then slightly down behind the wearer's ears at respective distal portions that themselves terminate at respective distal ends.

The headset 216 may further include one or more inward-facing RGB cameras 301, 303 that may be mounted within the headset 216. The cameras 301, 303 may be oriented to image the wearer's eyes for use with eye tracking in addition to or in lieu of IMU input use as set forth further below.

The headset 216 may also include at least four electrodes 308-314, including at least two electrodes 308, 310 for performing electrooculography (EOG) eye tracking of a user's left eye consistent with present principles and at least two electrodes 312, 314 for performing electrooculography eye tracking of the user's right eye consistent with present principles. Note that while at least two electrodes per eye may be used to identify electrooculogram data for each eye, additional electrodes for each eye may be used to further enhance the accuracy of the electrooculography.

In any case, as shown in FIG. 3, the electrode 308 for the left eye may be located on the temple 304 at or near its coupling to the bridge 302 and may face inward toward the user's head to contact the user's skin at or near the outer corner/canthus of the user's left eye. The electrode 310 may be coupled to a central nose piece portion 316 of the bridge 302 (that goes over the user's nose) and may face outward toward the user's nose to contact the user's skin at or near the inner corner/canthus of the user's left eye.

Likewise, the electrode 314 for the right eye may be located on the temple 306 at or near its coupling to the bridge 302 and may face inward toward the user's head to contact the user's skin at or near the outer corner/canthus of the user's right eye. The electrode 312 may be coupled to the central nose piece 316 of the bridge 302 and may face outward toward the user's nose to contact the user's skin at or near the inner corner/canthus of the user's right eye.

However, further note that the at least two electrodes for each eye might be located at other positions as well, such as at headset locations to contact the user's skin above and below the eye in the middle eye area. Thus, the electrode positioning shown in FIG. 3 is but one example implementation. But regardless, further note that the measurements of the electrodes 308-314 may be provided as input to a processor on or in communication with the headset 216 for electrooculographic eye tracking consistent with present principles. Thus, the eye may act as a dipole in which the anterior pole may be positive and the posterior pole may be negative so that, as the eye moves about within the user's head toward one of the two electrodes for the respective eye, the positive side of the retina may be identified from the input from that electrode and the negative side of the retina may be identified from the input from the other electrode for the same eye. Accordingly, the processor may perform eye tracking by inferring gaze angle/direction with respect to the head (e.g., forward-facing axis of the user's nose) based on retina orientation determined from the potential difference between the electrodes since the potential may be used a measure of the respective retina's orientation within the head.

As recognized herein, in some examples the correspondence of eye angle to electrode measurement may be subject to drift over time. Thus, principles set forth further below may be used to address drift and normalize the electrode signals for more accurate eye tracking.

But first, note as indicated above that the headset 216 may include some or all of the components of the system 100, including an IMU 318 similar to the IMU 191 as well as other components not shown in FIG. 3 for simplicity, such as the headset's CPU or other processor itself. The headset 216 may also include other elements not shown in FIG. 3 for simplicity, such as RAM and persistent storage that may both be accessible to the at least one processor on the headset 216. The headset 216 may further include one or more forward-facing cameras such as one mounted on the bridge 302 above the nose section so that the camera may have an outward-facing field of view similar to that of the user/wearer while wearing the headset 216. Cameras may be located at other headset locations as well. The headset 216 may further include a network interface (e.g., Wi-Fi, cellular, and/or Bluetooth transceiver) for communicating with other devices, and a rechargeable battery for powering other components of the headset 216.

Additionally, note that while the headset 216 is illustrated as computerized smart glasses, in other examples the headset may be a head-circumscribing augmented reality (AR) headset, mixed reality (MR) headset, virtual reality (VR) headset, or other type of headset/head-mounted display (HMD). For example, the headset may be a head-circumscribing VR headset with non-transparent displays but that still presents a real-time video feed from the headset's front-facing camera for AR viewing of the real world along with virtual three-dimensional VR objects and other digital objects presented stereoscopically by the headset.

Figure 4:
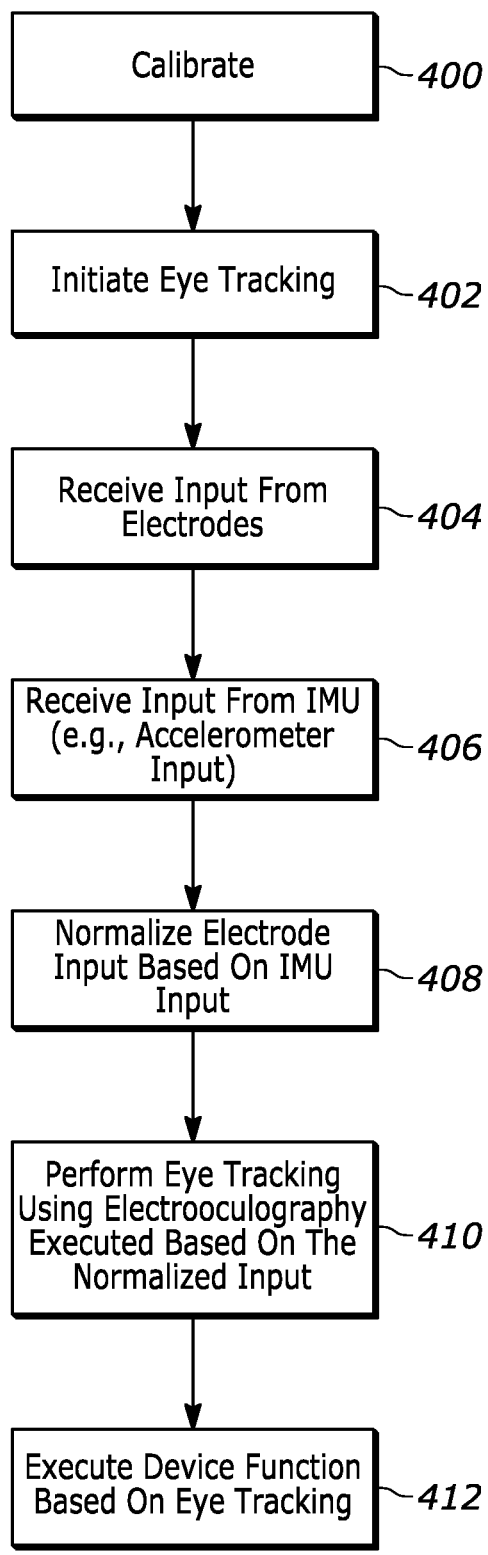
FIG. 4 illustrates example logic in example flow chart format that may be executed by a headset or other device consistent with present principles.

Referring now to FIG. 4, it shows example logic that may be executed by a device configured to operate consistent with present principles, such as the system 100, headset 216, and/or remotely located server communicating with an HMD in any appropriate combination. Note that while the logic of FIG. 4 is shown in flow chart format, other suitable logic may also be used.

Beginning at block 400, the device may calibrate itself for EOG-based eye tracking consistent with present principles, with the calibration process being described further below. From block 400 the logic may then move to block 402 where the device may execute one or more functions for which eye tracking is to be used and accordingly may initiate EOG-based eye tracking, e.g., by launching a dedicated EOG-based eye tracking application or process.

After block 402 the logic may proceed to block 404 where the device may begin receiving EOG signals/input from electrodes on the headset. The logic may then move to block 406 where the device may begin receiving input from an accelerometer or other IMU sensor on the headset. Thereafter, the logic may proceed to block 408.

At block 408 the device may normalize the electrode input/EGO signal based on the IMU input as described further below. Thereafter the logic may move to block 410 where the device may perform eye tracking using EOG executed based on the normalized inputs (e.g., eye tracking for one eye or both eyes) to, at block 412, execute a function at the device based on eye tracking.

For example, the function may be executing a particular eye-based command to select a graphical object presented on the headset's display, or allowing the user to interact with AR, MR, and/or VR content via eye input to look about the virtual environment and interact with it. Other example functions include moving a mouse cursor about the headset's own display or another display of another device (e.g., laptop computer) in display directions corresponding to the eye movement itself, monitoring rapid eye movement (REM) sleep patterns while the user is asleep, determining which part of a digital flyer or commercial a user looked at, and navigating graphical user interfaces (GUIs).

Further describing the normalization that may occur at block 408, initially note that to calculate eye position for EOG-based eye tracking, a difference between the electrode potentials for a given eye may be calculated. But further note that baseline drift may occur since these electrode measurements might slowly change over time, which can affect smooth pursuit tracking (e.g., following a target) and fixation tracking (e.g., when the eyes keep still). Drift may be further compounded by other forms of signal noise (muscle movements, vibrations, etc.).

Thus, to combat this, a fixation curve may be generated by the headset/device. The user may follow one or more virtual objects while the potential is recorded during a calibration process that will be described further below in reference to FIG. 5. The calibration process itself may be used to find parameters for signal deflection in a given EOG measurement ($C_{ix,y}$), measured as degrees/mV, normalized by the maximum potential difference in each coordinate axis. The positional estimate may then be given by $P_{x,y}=\text{sign}(EOG\ \text{gain})*C_{ix,y}$.

To also combat drift, head-mounted accelerometer inputs may be fused with the EOG eye positions as a means of normalizing drift (and/or noisy movements). Thus, the extended Kalman Filter may be used with a standard kinematic model (position, velocity, and acceleration) for the eye position (calculated from equation above) and the head position (from the IMU).

Accordingly, the normalization on the potential difference for the EOG may be performed by the HMD/headset. The normalization of the eye position with the head position may be determined through a gaussian density function by using both the kinematic model for the eye position and the kinematic model for the head/head movement (e.g., head movement with respect to the user's neck or otherwise in 3D space). Kinematic motion models for Kalman for $p_x$, $p_y$, $v_x$, $v_y$, $a_x$, and $a_y$ may be used.

Additionally, in some examples one or more inward-facing cameras, such as one or both of the RGB cameras 301, 303 from above, may be used to measure smooth pursuit in one eye and fuse that with the EOG. The camera may be a relatively lower-resolution camera using relatively few frames-per-second (FPS) eye-tracking (which might be less precise than IR eye tracking using a higher-resolution camera with more FPS, but possibly not as noisy, and would possibly use much less computational power) in tandem with EOG and fuse the positional results, again with a Kalman filter and kinematic motion models, for enhanced and more accurate eye tracking results at a lower computational expense.

Figure 5:
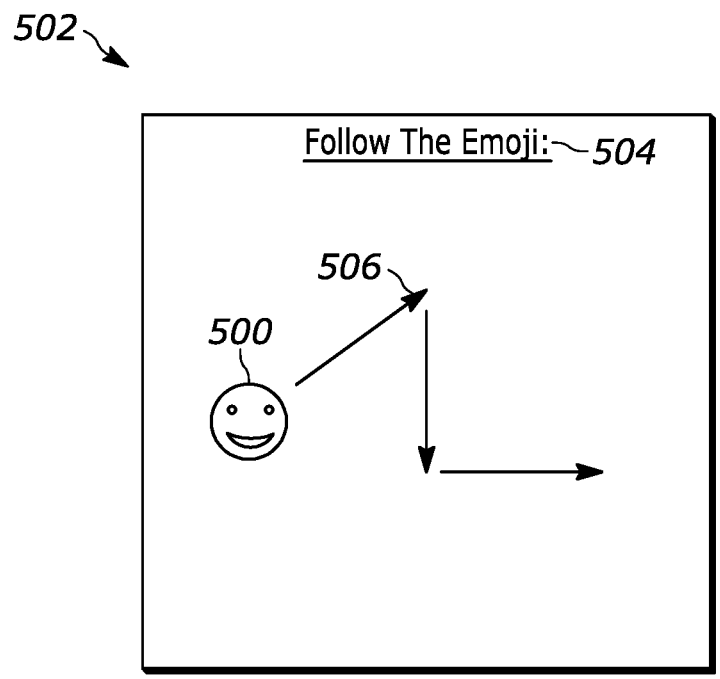
FIG. 5 shows a graphical user interface (GUI) that may be used as part of an EOG-based eye tracking calibration process consistent with present principles.

Now describing FIG. 5, a display presentation for the aforementioned calibration process will now be described. As shown, the display presentation may include at least one graphical object 500 presented on a graphical user interface (GUI) 502 that itself is presented on the headset's display (e.g., as integrated into AR glass lenses). As shown in FIG. 5, the object 500 includes a happy face emoji and the instructions 504 presented as part of the GUI 502 may instruct the user currently wearing the headset to continually follow the positioning of the object 500 with his/her eyes as the object moves about the headset's display. Arrows 506 indicate a sequence of display directions in which the object 500 might move (at a constant speed for the user to follow via smooth pursuit) from the initial position shown in FIG. 5 as part of the calibration process. At one point or another, the object 500 might reach each corner of the user's field of view and/or each corner of the display to identify extremes. EOG-based eye tracking may thus be executed as discussed above during this calibration process to generate data used at block 408 for normalization.

Figure 6:
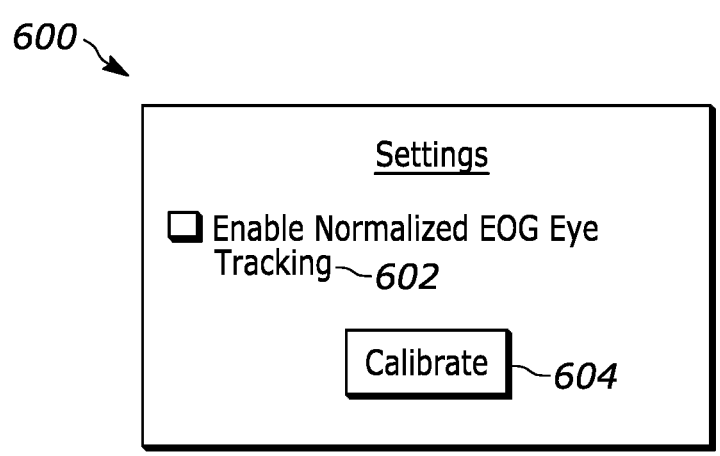
FIG. 6 shows an example GUI that may be presented on a display to configure one or more settings of a headset or other device to operate consistent with present principles.

Continuing the detailed description in reference to FIG. 6, it shows an example GUI 600 that may be presented during a setup process for a headset configured to operate consistent with present principles, or at the user's choosing by navigating a settings menu for the headset for example. As shown in FIG. 6, the GUI 600 may include at least a first option 602 that may be selectable a single time via touch, cursor, or other input to set or enable the headset to, for multiple future instances of eye tracking, execute the functions described above. For example. the option 602 may be selected to set or configure the device to execute the logic of FIG. 4 for EOB-based eye tracking with normalization based on IMU input.

As also shown in FIG. 6, the GUI 600 may include a selector 604 that may be selectable to initiate a calibration process consistent with the disclosure above. For example, the selector 604 may be selected to command the headset to present the GUI 500 of FIG. 5 to move a graphical object about the headset's display as part of the calibration.

It may now be appreciated that present principles provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged, or excluded from other embodiments.

What is claimed is:

1. A headset, comprising:
   at least one processor;
   a display accessible to the at least one processor;
   at least two electrodes accessible to the at least one processor;
   an inertial measurement unit (IMU) accessible to the at least one processor; and
   storage accessible to the at least one processor and comprising instructions executable by the at least one processor to:
   execute a calibration process at least in part at the headset at least in part by moving one or more graphical objects about the display and tracking a user's eyes as the user views the one or more graphical objects moving about the display;
   receive input from the at least two electrodes;
   receive input from the IMU;
   normalize the input from the at least two electrodes based on the input from the IMU and data from the calibration process;
   perform eye tracking, using electrooculography (EOG) that is executed based on the normalized input from the at least two electrodes, to identify user selection of a graphical object presented on the display.

2. The headset of claim 1, wherein the instructions are executable to:
   as part of the calibration process, present instructions on the display, the instructions instructing the user to follow the positioning of a first graphical object of the one or more graphical objects as the first graphical object moves about the display.

3. The headset of claim 1, wherein the instructions are executable to:
   as part of the calibration process, move a first graphical object of the one or more graphical objects about the display in multiple directions.

4. The headset of claim 3, wherein the instructions are executable to:
   as part of the calibration process, move the first graphical object about the display at a constant speed for the user to follow via smooth pursuit.

5. The headset of claim 1, wherein the instructions are executable to:
   as part of the calibration process, move a first graphical object of the one or more graphical objects to respective corners of the display to identify field of view extremes.

6. The headset of claim 1, wherein the instructions are executable to:
   present a graphical user interface (GUI) on the display, the GUI comprising a selector that is selectable to initiate the calibration process.

7. The headset of claim 6, wherein the GUI comprises an option that is selectable a single time to set the headset to, for multiple future instances of eye tracking, execute the normalizing step and performance of eye tracking step.

8. The headset of claim 6, wherein the GUI is presented during a setup process for the headset.

9. The headset of claim 1, wherein the instructions are executable to:
   present a graphical user interface (GUI) on the display, the GUI comprising an option that is selectable a single time to set the headset to, for multiple future instances of eye tracking, execute the normalizing step and performance of eye tracking step.

10. A method, comprising:
    executing a calibration process at least in part at a headset at least in part by moving one or more graphical objects about a display of the headset and tracking a user's eyes via electrooculography (EOG) as the user views the one or more graphical objects moving about the display;

receiving input from at least two electrodes on the headset;

receiving input from an inertial measurement unit (IMU) on the headset;

normalizing the input from the at least two electrodes based on the input from the IMU and the calibration process to perform eye tracking; and performing the eye tracking using EOG, the eye tracking executed based on the normalized input from the at least two electrodes.

11. The method of claim 10, comprising:

as part of the calibration process, moving a first graphical object of the one or more graphical objects about the display in multiple directions.

12. The method of claim 11, comprising:

as part of the calibration process, moving the first graphical object about the display at a constant speed for the user to follow via smooth pursuit.

13. The method of claim 10, comprising:

presenting a graphical user interface (GUI) on the display, the GUI comprising a selector that is selectable to initiate the calibration process.

14. The method of claim 10, comprising:

presenting a graphical user interface (GUI) on the display, the GUI comprising an option that is selectable a single time to set the headset to, for multiple future instances of eye tracking, execute the normalizing step and performing step.

15. At least one computer readable storage medium (CRSM) that is not a transitory signal, the computer readable storage medium comprising instructions executable by at least one processor to:

execute an eye tracking calibration process at least in part by moving one or more graphical objects about a display and tracking a user's eyes as the user views the one or more graphical objects moving about the display;

receive input from at least two electrodes on a headset;

receive input from an inertial measurement unit (IMU) on the headset; and based on the eye tracking calibration process, process the input from the at least two electrodes and the input from the IMU to perform eye tracking.

16. The CRSM of claim 15, wherein the instructions are executable to:

as part of the eye tracking calibration process, move a first graphical object of the one or more graphical objects about the display in multiple directions.

17. The CRSM of claim 16, wherein the instructions are executable to:

as part of the eye tracking calibration process, move the first graphical object about the display at a constant speed for the user to follow via smooth pursuit.

18. The CRSM of claim 15, wherein the instructions are executable to:

as part of the eye tracking calibration process, move a first graphical object of the one or more graphical objects to respective corners of the display to identify field of view extremes.

19. The CRSM of claim 15, wherein the instructions are executable to:

present a graphical user interface (GUI) on the display, the GUI comprising a selector that is selectable to initiate the eye tracking calibration process.

20. The CRSM of claim 15, wherein the instructions are executable to:

present a graphical user interface (GUI) on the display, the GUI comprising an option that is selectable a single time to set the at least one processor to, for multiple future instances of eye tracking, process input from the electrodes and input from the IMU to perform eye tracking.

* * * * *